(12) United States Patent
Strehle et al.

(10) Patent No.: US 10,286,884 B2
(45) Date of Patent: May 14, 2019

(54) VEHICLE BRAKE SYSTEM HAVING ELECTRONIC PRESSURE REGULATION, AND METHOD FOR CONTROLLING A VEHICLE BRAKE SYSTEM HAVING ELECTRONIC PRESSURE REGULATION

(71) Applicant: Robert Bosch GmbH, Stuttgart (DE)

(72) Inventors: Alfred Strehle, Fellbach (DE); Marko Flinner, Boxberg-Bobstadt (DE); Matthias Schanzenbach, Eberstadt (DE); Thomas Schmidt, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/583,537

(22) Filed: May 1, 2017

(65) Prior Publication Data
US 2017/0341631 A1 Nov. 30, 2017

(30) Foreign Application Priority Data
May 24, 2016 (DE) .................. 10 2016 208 966

(51) Int. Cl.
*B60T 8/26* (2006.01)
*B60T 7/04* (2006.01)
(Continued)

(52) U.S. Cl.
CPC ............... *B60T 8/266* (2013.01); *B60T 7/04* (2013.01); *B60T 7/042* (2013.01); *B60T 8/268* (2013.01);
(Continued)

(58) Field of Classification Search
CPC .......... B60T 7/12; B60T 11/103; B60T 8/266; B60T 7/04; B60T 7/042; B60T 8/268;
(Continued)

(56) References Cited

U.S. PATENT DOCUMENTS

2016/0339885 A1* 11/2016 Linhoff .................. B60T 8/4072
2017/0341630 A1* 11/2017 Zipfel ................... B60T 11/103

FOREIGN PATENT DOCUMENTS

| DE | 102009001135 A1 | 8/2010 | |
|---|---|---|---|
| DE | 102014220440 A1 * | 7/2015 | ............ B60T 8/4072 |

* cited by examiner

*Primary Examiner* — Melanie Torres Williams
(74) *Attorney, Agent, or Firm* — Norton Rose Fulbright US LLP; Gerard Messina (57) ABSTRACT

A vehicle brake system having electronic pressure regulation and a related method, in which the system stabilizes a vehicle, supports the actuation of the brake system, and/or enables a fully/partly automated driving operation. The system has a primary actuator system that sets/regulates different brake pressures at the wheel brakes, and an electronically controllable secondary actuator system that secures the vehicle brake system against primary actuator failure. For a primary actuator error, the secondary actuator is controlled so that the secondary system produces a brake pressure that, based on the dynamic axle load displacement, occurring during a braking process, in the direction of a front axle, is greater than the brake pressure that is convertable into a rear axle wheel brake braking power. A device reduces this brake pressure at the rear axle wheel brake to a value at which the vehicle wheel, assigned to this wheel brake, does not lock.

8 Claims, 5 Drawing Sheets (51) Int. Cl.
- *B60T 13/16* (2006.01)
- *B60T 13/68* (2006.01)
- *B60T 13/14* (2006.01)
- *B60T 13/66* (2006.01)
- *B60T 13/74* (2006.01)
- *B60T 17/22* (2006.01)
- *B60T 8/48* (2006.01)

(52) U.S. Cl.
CPC .......... *B60T 13/146* (2013.01); *B60T 13/161* (2013.01); *B60T 13/662* (2013.01); *B60T 13/686* (2013.01); *B60T 13/745* (2013.01); *B60T 17/22* (2013.01); *B60T 8/4872* (2013.01); *B60T 2270/402* (2013.01)

(58) Field of Classification Search
CPC .... B60T 13/146; B60T 13/161; B60T 13/662; B60T 13/686; B60T 13/745; B60T 17/22
See application file for complete search history.

VEHICLE BRAKE SYSTEM HAVING ELECTRONIC PRESSURE REGULATION, AND METHOD FOR CONTROLLING A VEHICLE BRAKE SYSTEM HAVING ELECTRONIC PRESSURE REGULATION

RELATED APPLICATION INFORMATION

The present application claims priority to and the benefit of German patent application no. 10 2016 208 966.8, which was filed in Germany on May 24, 2016, the disclosure of which is incorporated herein by reference.

FIELD OF THE INVENTION

The present invention is based on a vehicle brake system having electronic pressure regulation, and to a method for controlling a vehicle brake system having electronic pressure regulation.

BACKGROUND INFORMATION

Vehicle brake systems having electronic pressure regulation are discussed for example in DE 10 2009 001135 A1.

This vehicle brake system includes a first actuator system, hereinafter designated the primary actuator system, in the form of a conventional ABS/ESP brake system for the wheel-individual modulation of the brake pressure as a function of the slippage conditions prevailing at the wheels. The brake pressures of the individual wheel brakes can be set or regulated independently of one another. In connection with a conventional four-wheeled motor vehicle, one therefore speaks of a four-channel regulating actuator system. The brake system includes, inter alia, a pressure medium aggregate made up of a housing block equipped with pumps and valves and an electronic control device that actuates the pumps and valves as a function of sensor signals that describe the slippage conditions at the individual wheels.

This primary actuator system makes it possible to stabilize a driving state of a vehicle during a braking process, during startup, or during driving operation, by braking the wheels affected by slippage in a targeted manner. The brake pressure required for this can be produced together with the driver or independently of the driver. Accordingly, the primary actuator system operates in a so-called partially active mode or in a fully active mode.

In addition, such a vehicle brake system has a second actuator system, or secondary actuator system, in the form of an electromechanical brake booster. This secondary actuator system is connected to the master brake cylinder, and in normal operation is used to increase driver comfort by supporting the driver in the building up of a brake pressure required for braking process. For this purpose, an electromechanical brake booster includes an actuator that can be controlled by an electronic control device, which provides an external force for actuating a master brake cylinder. The actuation of the master brake cylinder can take place solely via the external force of the secondary actuator system, or through a combination of this external force with muscular force provided by the driver.

The first and second actuator system, or primary and secondary actuator system, accordingly form two mutually redundant systems for producing and modulating a brake pressure in a vehicle brake system, where this brake pressure modulation can be carried out with or without the participation of the driver. The two actuator systems thus provide an essential basic precondition for realizing and carrying out partly or fully automated driving operation. Because during such automated driving operation the driver performs only a monitoring function, particularly high demands with regard to safety against failure are made on such vehicle brake systems having electronic pressure regulation, which demands are met by maintaining the mentioned redundancy.

However, the known secondary actuator system, differing from the primary actuator system, is capable of supplying all wheel brakes of the vehicle brake system connected to the master brake cylinder with a uniform brake pressure, or modulating this brake pressure in a uniform fashion, only through actuation of the master brake cylinder. Experts refer to this functioning as one-channel regulation actuator technology. A one-channel secondary actuator system is nonetheless capable of braking a vehicle to a standstill, while maintaining directional stability, in the case of malfunction of the primary actuator system.

Minimum requirements for the longitudinal or directional stabilization of the vehicle during a braking process controlled by the secondary actuator system are: the maintenance of a locking sequence, i.e. a building up of brake pressure in such a way that the wheel brakes of the front axle reach their locking limit temporally before the wheel brakes of the rear axle; maintaining the steerability of the vehicle and consequently ensuring a maximum locking time of the vehicle wheels; and the possibility of an active, or driver-independent, buildup of a brake pressure.

In particular given high deceleration values, the wheels of the rear axle tend to lock before the wheels of the front axle, and can thus bring about an unstable vehicle state. The maximum deceleration values of the vehicle that can be achieved therefore depend strongly on a braking power that can be realized by the wheel brakes of the rear axle. However, this braking power is relatively low due to the dynamic axle load displacement in the direction of the front axle that takes place during a braking process for reasons of mass inertia, because an increase in the axle load on the front axle necessarily entails a reduction in the axle load on the rear axle.

Due to the explained property of the secondary actuator system of being able to bring about only a uniform brake pressure at all wheel brakes that are present, in combination with a low brake pressure that can be realized by the wheel brakes of the rear axle without danger of locking of the associated wheels, in the case of a braking process in which the brake pressure is produced by the secondary actuator system due to an occurrent malfunction at the primary actuator system the disadvantage results that an overall braking power that can be realized of the vehicle turns out to be relatively low, or that consequently a relatively long brake path of the vehicle results. This has a particularly negative effect in vehicles in which the dynamic axle load displacement in the direction of the front axle during a braking process is particularly large.

A known approach for avoiding this disadvantage is to adapt the controlling of the secondary actuator system to the mentioned dynamic axle load displacement in the direction of the front axle, in combination with a decoupling of the wheel brakes of the rear axle from the wheel brakes of the front axle with regard to the brake pressure that is present. As a consequence, the brake pressure provided by the secondary actuator system can still be converted to its full extent into braking power by the more strongly loaded wheels of the front axle, but is nonetheless higher than a braking power that can be realized by the wheel brakes, correspondingly relieved of load, of the rear axle. Under these conditions, in order to prevent overbraking of the rear axle, or a locking of the wheels of the rear axle, and consequently an unstable vehicle state, the rear axle is decoupled from the front axle with regard to its brake pressure.

This decoupling takes place with the aid of a valve device that reduces the brake pressure at the wheel brakes of the rear axle compared to the brake pressure at the wheel brakes of the front axle. This reduction is carried out to a brake pressure level that can be completely converted by the wheel brakes of the rear axle into a braking power without the locking of one of the associated wheels of the rear axle.

Due to the occurrent malfunction of the primary actuator system, its valve devices cannot be controlled, and therefore cannot easily be used for this purpose. To separately provide for this purpose an additional valve device, including an additional electronic control device for controlling, would require a large outlay and would be expensive, and would require additional constructive space in the already-tight space conditions.

SUMMARY OF THE INVENTION

A vehicle brake system having electronic pressure regulation according to the features described herein, or a method for controlling an electronic vehicle brake system having electronic pressure regulation as described herein, avoids the disadvantages explained above.

The vehicle brake system having electronic pressure regulation according to the features described herein provides the use of the valve device, which controls the brake pressure at the wheel brakes of the rear axle, of the primary actuator system to reduce the brake pressure, provided by the secondary actuator system, at the wheel brakes of the rear axle, and remedies the lack of control in case of error of the primary actuator system in that this valve device can be controlled by a second electronic control device, which can be operated independently relative to the first control device, using a second control signal.

According to the present invention, two redundant electronic control devices are accordingly provided within a vehicle brake system having pressure regulation, in order to electronically control the valve devices, assigned to the wheel brakes of the rear axle, of the primary actuator system.

With this capacity of redundant controlling of the valve devices, assigned to the wheel brakes of the rear axle, of the primary actuator system, in a motor vehicle equipped with a vehicle brake system according to the present invention a decoupling of the wheel brakes of the rear axle from the brake pressure of the wheel brakes of the front axle is ensured even in case of error of the primary actuator system, and the motor vehicle can be braked to a standstill by the secondary actuator system in directionally stable fashion and with a shorter brake path. The present invention minimizes the constructive outlay required to achieve this.

Further advantages, or advantageous confiigurations, of the present invention result from the further descriptions herein and from the following description.

The present invention according to the features described herein has the advantage that the second control signal of the valve device is provided by the second electronic control device, which is already present and is assigned to the secondary actuator system.

The features of the further descriptions herein relate to advantageous constructive configurations of an actuator of the valve device for the possible realization of the explained functionality.

The present invention is illustrated on the basis of the drawing and is explained in detail in the following description.

In the Figures, corresponding components have been provided with the same reference characters.

DETAILED DESCRIPTION

Figure 1:
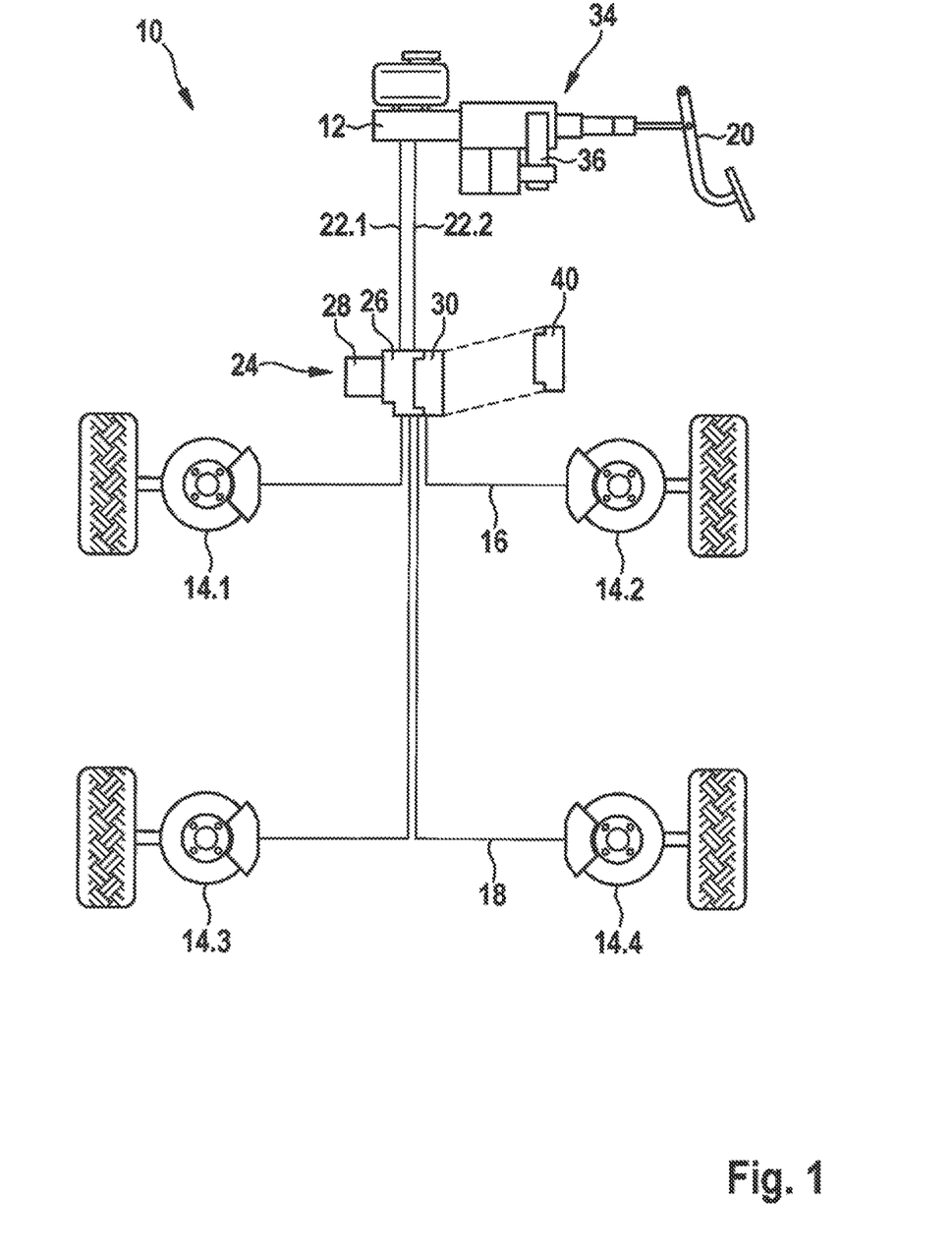
FIG. 1 shows, in schematically simplified fashion, the design of a vehicle brake system forming the basis of the present invention.

FIG. 1 shows a vehicle brake system 10 having a master brake cylinder 12 and a total of four wheel brakes connected thereto, 14.1-14.4. Two wheel brakes 14.1; 14.2 are respectively assigned to a front axle 16 and a rear axle 18 of the vehicle. Master brake cylinder 12 can be actuated by muscular force for example via a brake pedal 20, and supplies two connected brake circuits 22.1; 22.2 with pressure medium under brake pressure. Between master brake cylinder 12 and wheel brakes 14 there is connected a primary actuator system 24 that modulates the brake pressure at wheel brakes 14, taking into account the slippage conditions prevailing at the respectively assigned wheels. For this purpose, primary actuator system 24 is equipped with a pressure medium aggregate made up of a housing block 26, an electronically controllable drive motor 28 for actuating pressure medium pumps (not visible), and a first electronic control device 30. First electronic control device 30 evaluates sensor signals that describe the slippage conditions at the wheels, and from these signals generates corresponding control signals for the components of primary actuator system 24. As a result, the primary actuator system is capable of setting wheel-individual brake pressures at the respective wheel brakes 14. A more detailed description of the design of primary actuator system 24 is provided in connection with the description of FIG. 2.

In addition, vehicle brake system 10 has a secondary actuator system 34. This is situated between brake pedal 20 and master brake cylinder 12, and is also provided with an electronically controllable actuator 36. This actuator 36 produces an external force by which master brake cylinder 12 can be actuated.

Actuation of master brake cylinder 12 can thus take place by muscular force, external force, or a combination of muscular force and external force. Secondary actuator system 34 has assigned to it a second electronic control device 40 that can be operated independently of first control device 30 and that generates, from the sensor signals, a second control signal for controlling actuator 36 of the secondary actuator system. Second electronic control device 40 can be a constructively integral but nonetheless separately operable component of first electronic control device 30; however, it would be equally conceivable to realize the two control devices 30, 40 constructively separately from one another, to situate them on one another, or to place them on the vehicle spatially separated from one another.

Figure 2:
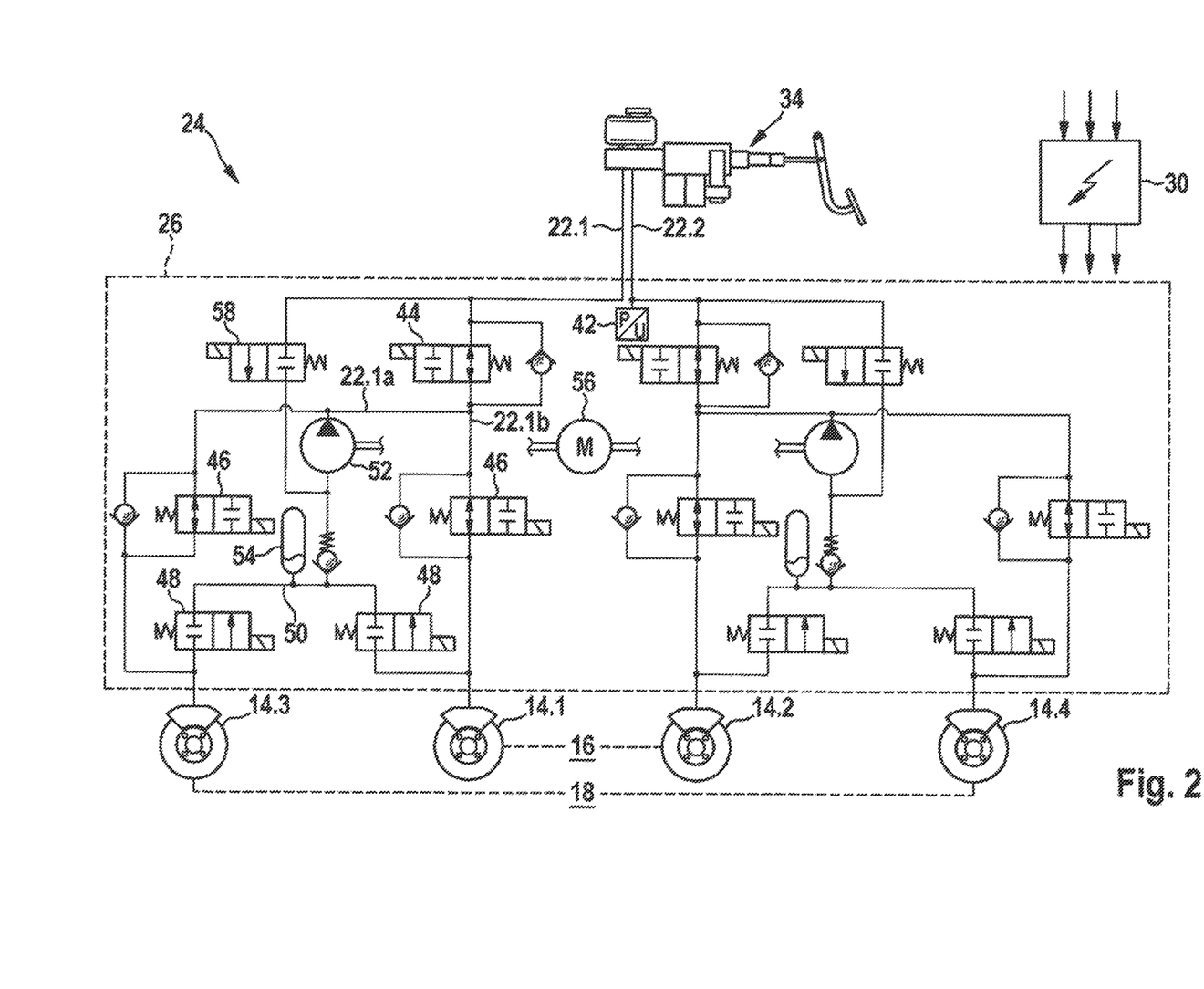
FIG. 2 shows the circuit diagram of a primary actuator system of the vehicle brake system of FIG. 1, on the basis of circuit symbols and line connections between the components involved.

FIG. 2 discloses the design of primary actuator system 24 on the basis of a pressure medium circuit diagram that illustrates the provided components that control the pressure medium and the line connections between them. This primary actuator system 24 is the pressure medium aggregate, in particular a pressure medium-conducting housing block 26 of a vehicle brake system having electronic slippage regulation, or a so-called ABS/ESP brake system. Its equipping with components that control pressure medium is fundamentally part of the existing art, and is therefore explained only in cursory fashion below.

Two brake circuits 22.1; 22.2 are connected to master brake cylinder 12; with the exception of a sensor 42 for acquiring a brake circuit pressure in brake circuit 22.2, these circuits are identical in design. Each brake circuit is contacted with master brake cylinder 12 via an electronically controllable, normally open 2/2-way changeover valve 44. Downstream from changeover valve 44, brake circuit 22.1 branches into two brake circuit branches 22.1a; 22.1b, each brake circuit branch 22.1a; 22.1b supplying brake pressure to an assigned wheel brake. Brake circuits 22.1; 22.2 are diagonally partitioned; i.e., each brake circuit 22.1; 22.2 supplies a wheel brake of a front axle 16 and a wheel brake of a rear axle 18 of the vehicle with pressure medium. The wheel brakes of a brake circuit 22.1; 22.2 are assigned to wheels of the vehicle situated diagonally opposite one another.

For the regulation of the brake pressure, a pressure buildup valve 46 is connected before each wheel brake, and a pressure reducing valve 48 is connected after each wheel brake. As pressure buildup valve 46, an electronically controllable, normally open 2/2-way proportional valve is provided, and as pressure reducing valve 48 an electronically controllable, normally closed 2/2-way switching valve is provided. Via pressure reducing valve 48, pressure medium flowing out from wheel brake 14 goes into a recirculation line 50 that is connected to the intake side of a pressure medium pump 52. Between pressure reduction valve 48 and pressure medium pump 52 there is situated a pressure medium reservoir 54 in recirculation line 50 that at first buffers the pressure medium flowing out. One pressure side of pressure medium pump 52 is connected to brake circuit 22.1 between changeover valve 44 and pressure buildup valve 46. In order to drive pressure medium pump 52, a controllable electric motor 56 is present. The intake side of pressure medium pump 52 is additionally connected to master brake cylinder 12 via a so-called high-pressure switching valve 58. This high-pressure switching valve 58 is realized as an electronically controllable, normally closed 2/2-way changeover valve.

First electronic control device 30 is shown only symbolically in FIG. 2.

Figure 3:
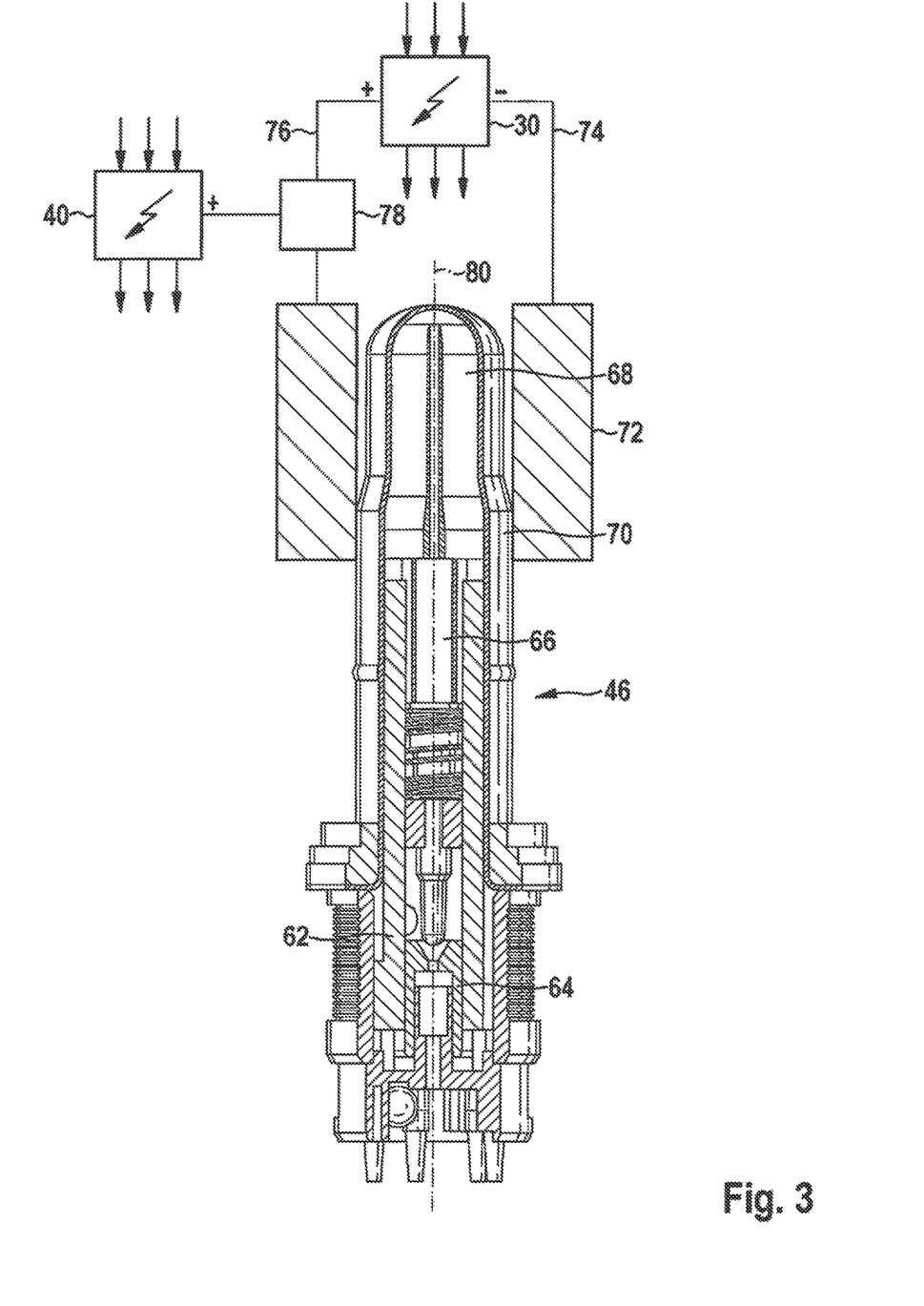
FIG. 3 shows a first exemplary embodiment of a valve device of the primary actuator system of FIG. 2.

FIG. 3 shows, in a partly schematic representation, the constructive realization of a pressure buildup valve 46, as present in each brake circuit branch 22.1a; 22.1b. This is divided into a valve housing 62 having a valve seat 64 in which a closing element 66 is accommodated so as to be guided movably. Closing element 66 is fashioned as a tappet, and can be actuated by an armature 68. The armature is displaceably accommodated inside a dome-shaped valve sleeve 70. With its end open at one side, this valve sleeve 70 is fastened on valve housing 62. An annular magnetic coil 72 surrounds valve sleeve 70 on its outer circumference. When electronically controlled, it exerts a magnetic force on armature 68, on the basis of which the armature executes a stroke movement and transfers it to closing element 66. As a result, this closing element approaches valve seat 64 and closes it in the end position. With the closing of the valve seat 64 of pressure buildup valve 46, a pressure medium connection between master brake cylinder 12 and wheel brake 14 assigned to pressure buildup valve 46 is interrupted, and a further brake pressure buildup is no longer possible. As already mentioned, the electronic controlling of pressure buildup valve 46 during normal operation of vehicle brake system 10 is carried out by first electronic control device 30 of primary actuator system 24.

According to FIG. 3, the present invention provides that those pressure buildup valves 46 of vehicle brake system 10 that are assigned to wheel brakes 14 of rear axle 18 of the vehicle are to be controlled not solely by first electronic control device 30 of primary actuator system 24, as is known from the existing art; rather, these wheel brakes 14 can be controlled both by first electronic control device 30 of primary actuator system 24 and by a second electronic control device 40, this controlling of second electronic control device 40 being active only when a malfunction has occurred or has been determined at first electronic control device 30 or at primary actuator system 24.

Second electronic control device 40 can be operated by itself, i.e. independent of first electronic control device 30, and supplies a second control signal independent of the control signal of first electronic control device 30. The controlling of pressure buildup valves 46 of wheel brakes 14 of rear axle 18 of the vehicle is thus realized in redundant fashion according to the present invention. According to FIG. 3, for this purpose a changeover electronics 78 is provided in a signal line 76 that transmits the control signal of first electronic control device 30, via which electronics the control signal of second electronic device 40 can be transmitted to magnetic coil 72 of pressure buildup valve 46 in the case of error of primary actuator system 24.

The ground line 74 necessary for a signal transmission can be used in common by first electronic control device 30 and second electronic control device 40. Pressure buildup valve 46 according to FIG. 3 makes do with a single magnetic coil 72 that can be controlled via changeover electronics 78 by both control devices 30; 40.

Figure 4:
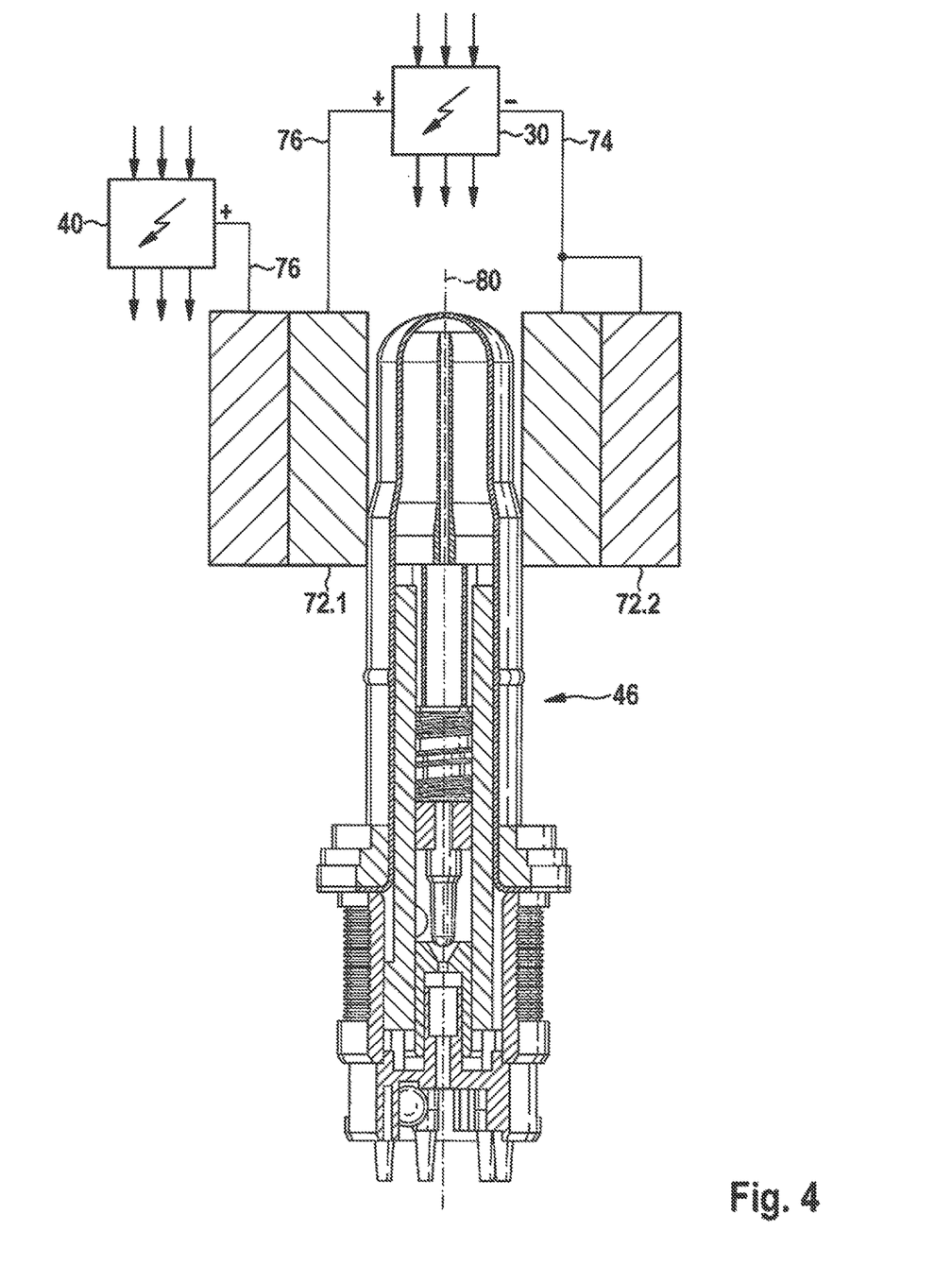
FIG. 4 shows a second exemplary embodiment of the valve device.

FIG. 4 shows a second exemplary embodiment of a pressure buildup valve 46. Pressure buildup valve 46 is equipped with two magnetic coils 72.1; 72.2, each assigned to one of the two electronic control devices 30; 40. The one magnetic coil 72.2 surrounds the respective other magnetic coil 72.1 at least in some segments along its outer circumference. In the depicted specific embodiment, inner first magnetic coil 72.1 is assigned to first electronic control device 30 of primary actuator system 24, while outer, second magnetic coil 72.2 is controlled by second electronic control device 40. In this exemplary embodiment as well, the two magnetic coils 72.1; 72.2 are connected to the same ground line 74. This exemplary embodiment has the advantage that the securing of the function of vehicle brake system 10 is ensured even when the error occurring at primary actuator system 24 is due to damage to magnetic coil 72.1 of pressure buildup valve 46 at a wheel brake of rear axle 18.

Figure 5:
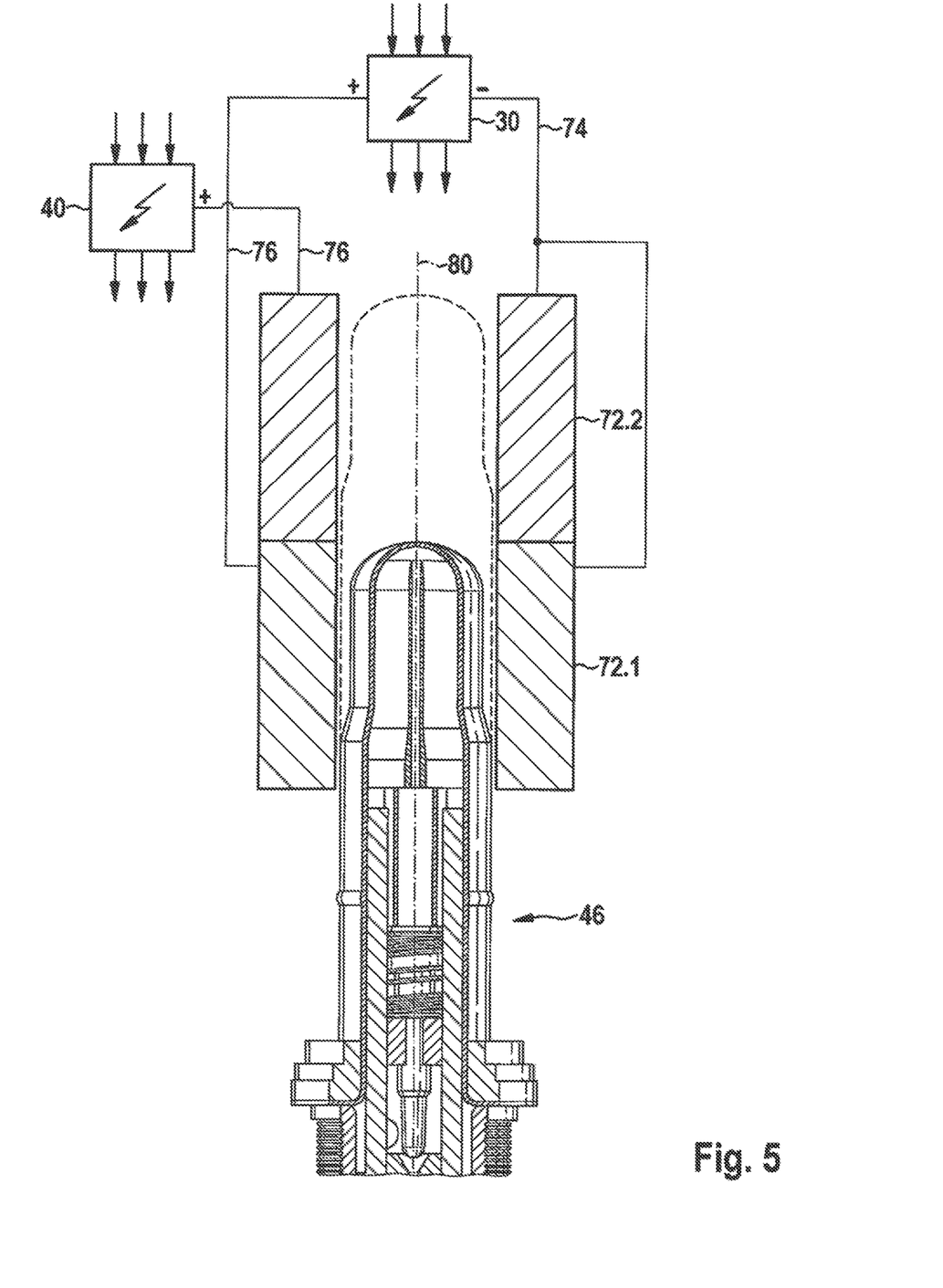
FIG. 5 shows a third exemplary embodiment of the valve device.

The further exemplary embodiment according to FIG. 5 also uses a pressure buildup valve 46 having two magnetic coils 72.1; 72.2 that can be controlled independently of each other. However, here magnetic coils 72.1; 72.2 are not configured so as to surround one another circumferentially, but rather are axially aligned situated next to one another or one after the other in the direction of a longitudinal axis 80 of pressure buildup valve 46. However, this configuration of magnetic coils 72 has the result that the relevant pressure buildup valves 46 are longer in the direction of their longitudinal axis 80, and have an armature 68 that is longer in comparison with the exemplary embodiments according to FIG. 3 and FIG. 4, as well as a correspondingly longer valve sleeve 70, as is illustrated by the dotted outline in FIG. 5.

Second electronic control device 40, on which the present invention is based, can be realized as a separately installed unit, or can be integrated, in a particularly space-saving and low-cost fashion, in electronic control device 40 of secondary actuator system 34, which is already present anyway.

For completeness, it is noted that in the case of error of primary actuator system 24, through suitable electronic controlling of pressure buildup valves 46 of wheel brakes 14.3; 14.4 of rear axle 18, in combination with a corresponding controlling of secondary actuator system 34, a brake pressure buildup, a maintenance of a brake pressure once set, and also a brake pressure reduction at wheel brakes 14.3; 14.4 of rear axle 18 can all be carried out. During a pressure buildup, there can be a flow through pressure buildup valves 46 at the wheel brakes of rear axle 18 in the one direction of flow, and during a pressure reduction the flow can be in the opposite direction. In contrast, flow takes place through pressure buildup valves 46 of the wheel brakes of front axle 16 only in the direction towards wheel brakes 14.1; 14.2.

Of course, modifications or supplementations of the described exemplary embodiments, going beyond the above description, are conceivable without departing from the aspects of the exemplary embodiments of the present inventions described herein.

What is claimed is:

1. A vehicle brake system having electronic pressure regulation, a master brake cylinder actuatable by muscular force, to which at least one wheel brake assigned to a front axle and at least one wheel brake assigned to a rear axle of the vehicle are separably connected, comprising:
    an electronically controllable primary actuator system for setting and regulating brake pressures differing from one another in the wheel brakes as a function of signals describing driver comfort, the traffic situation, and/or the driving stability of the motor vehicle, which signals are further processed by a first electronic control device to form control signals of the primary actuator system;
    an electronically controllable secondary actuator system for at least providing indirect setting and regulation of a uniform brake pressure at the wheel brakes of the vehicle brake system; and
    a device, assigned to the at least one wheel brake of the rear axle, for setting a brake pressure, which, given a functional primary actuator system, is controllable by the first control device with a first control signal;
    wherein the device, in case of an error of the primary actuator system, is controllable by a second electronic control device that is operable independently relative to the first control device, with a second control signal.

2. The vehicle brake system of claim 1, wherein the second electronic control device is configured to electronically control the secondary actuator system.

3. The vehicle brake system of claim 1, wherein, in a signal line that transmits the first control signal from the first electronic control device to the device, there is a changeover electronics via which the second control signal of the second electronic control device is transmittable to the device.

4. The vehicle brake system of claim 1, wherein the device includes a magnetic coil that actuates, via an armature, a closing element that controls a valve seat, wherein the device includes at least one second magnetic coil, and wherein the two magnetic coils are assigned respectively to one of the electronic control devices.

5. The vehicle brake system of claim 4, wherein the magnetic coils are configured coaxially to one another on a valve housing, and wherein the one magnetic coil surrounds a respective other magnetic coil at least in segments along its outer circumference.

6. The vehicle brake system of claim 4, wherein the magnetic coils are configured coaxially to one another on a valve housing, and wherein the magnetic coils are configured one after the other in a direction of a longitudinal axis of the device.

7. The vehicle brake system of claim 1, wherein the device controls a pressure medium flow to and from the wheel brake of the rear axle.

8. A method for controlling a vehicle brake system having electronic pressure regulation, a master brake cylinder that is actuatable by muscular force, to which at least one wheel brake assigned to a front axle and at least one wheel brake assigned to a rear axle of the vehicle are separably connected, the method comprising:
    setting and regulating, via an electronically controllable primary actuator system, brake pressures, differing from one another, in the wheel brakes as a function of signals describing driver comfort, the traffic situation, and/or the driving stability of the motor vehicle, which signals are further processed by a first electronic control device to form control signals of the primary actuator system;
    setting and regulating, via an electronically controllable secondary actuator system, a uniform brake pressure at the wheel brakes of the vehicle brake system; and
    setting, via a device, a brake pressure at the at least one wheel brake of the rear axle, which, given a functional primary actuator system, is controllable by the first control device with a first control signal;
    wherein in case of an error of the primary actuator system, the device is controllable with a second control signal that is provided by a second electronic control device that is operable independently relative to the first control device.

* * * * *